United States Patent [19]
Lawton et al.

[11] Patent Number: 5,427,763
[45] Date of Patent: Jun. 27, 1995

[54] METHOD FOR MAKING VANADIUM DIOXIDE POWDERS

[75] Inventors: Stanley A. Lawton, St. Louis; Edward A. Theby, St. Charles, both of Mo.

[73] Assignee: McDonnel Douglas Corp., St. Louis, Mo.

[21] Appl. No.: 228,592

[22] Filed: Apr. 15, 1994

[51] Int. Cl.⁶ ............................................. C01G 31/00
[52] U.S. Cl. ................................... 423/593; 423/592
[58] Field of Search ..................... 423/592, 593, 275

[56] References Cited

U.S. PATENT DOCUMENTS

| | | | |
|---|---|---|---|
| 3,265,464 | 8/1966 | Udd | 423/592 |
| 3,542,697 | 11/1970 | Chamberland et al. | 423/593 |
| 3,562,188 | 2/1971 | Mitsuishi et al. | 423/592 |
| 3,650,680 | 3/1972 | Teeg et al. | 423/592 |
| 4,957,725 | 9/1990 | Potember et al. | 423/592 |

*Primary Examiner*—Steven Bos
*Attorney, Agent, or Firm*—Veo Peoples, Jr.; Peoples, Hale, & Coleman

[57] ABSTRACT

A method for making vanadium dioxide ($V_2$ or $V_2O_4$) powders from vanadyl sulfate without using $SO_2$ gas, comprises evaporative decomposition of a vanadyl sulfate hydrate spray, entrained in a nitrogen atmosphere at $O_2$ partial pressures that would normally predict $V_2O_5$ $V_2O_3$. The yield of $VO_2$ (also identified as $V_2O_4$) is substantially improved, and occurs at lower temperatures, by the addition of hydrogen gas into the atmosphere. Surprisingly, there is no production of $V_2O_3$. Minor amounts of a suitable dopant salt dissolved in the spray provide improved low transition temperature powders.

5 Claims, 3 Drawing Sheets

Phase transition temperature $T_t$ in $V_{1-x}M_xO_2$ for M= tungsten (circle) and M=molybdenum (square)

Phase transition temperature $T_t$ in $V_{1-x}M_xO_2$ for M=tungsten (circle) and M=molybdenum (square)

Tungsten-doped vanadium-dioxide powder, $W_x V_{1-x} O_2$, produced by evaporative spray pyrolysis of vanadyl sulfate hydrate and tungsten dioxide dichloride, $x = 0.02$.

Molybdenum-doped vanadium-dioxide powder, $Mo_x V_{1-x} O_2$, produced by evaporative spray pyrolysis of vanadyl sulfate hydrate and molybdenum dioxide dichloride, $x = 0.015$ x-ray diffraction patterns (Cu $K\alpha_1$) of doped vanadium dioxide powder.

METHOD FOR MAKING VANADIUM DIOXIDE POWDERS

BACKGROUND OF THE INVENTION

1. Field Invention

This invention relates generally to producing $VO_2$ powders and more particularly to a novel evaporative decomposition technique for producing such powders.

2. Description of the Prior Art

It is generally well known that solid $VO_2$, unlike other vanadium oxides $V_2O_3$, $V_2O_5$, etc., exhibits a low temperature (about 67° C.) phase transition from a monoclinic, semiconducting phase to a tetragonal metallic phase. During this phase transition, an abrupt change in certain physical properties such as electrical resistivity, magnetic susceptibility and infrared transmittance occurs. Because of its conveniently low transition temperature and, particularly, the large drop in near infrared transmittance, $VO_2$'s thermochromic properties render it a popular candidate for use in thermal relays, electrical and optical switches, optical storage media, modulation devices, etc.

Also, it is well known that doping $VO_2$ with other metal oxides can lower the transition temperature closer to room temperature thus enabling solid $VO_2$ to become useful in additional applications.

The production of $VO_2$ devices, and particularly doped-$VO_2$ devices, in the form of solid films by techniques such as reactive sputtering and sintering has become quite advanced. However, a need has arisen to produce $VO_2$ and doped $VO_2$ in the form of high quality micron sized powders, particularly in various aerospace applications where thin films and/or epitaxially grown crystals cannot be employed. Production of such powders has met with limited, if any, success.

For example, phase transition studies on tungsten dioxide ($WO_2$), doped $VO_2$ powders were conducted as early as 1969 by Israelsson and Kihlborg, "*The phase relations in the $VO_2$—$WO_2$ system*" Materials Research Bulletin 5, 19-30 (1970). The $VO_2$—$WO_2$ powder was produced by initially preparing $V_2O_5$. The $V_2O_5$ was then chemically reduced to $V_2O_3$ by hydrogen reduction for seven hours at 800° C. Mixtures of $V_2O_3$ and $V_2O_5$ were heated in evacuated silica tubes, keeping the temperature at 1100° C. for ten to twelve days, to produce $VO_2$. In a separate reaction, $H_2WO_4$ was heated to prepare $WO_3$, which was thereafter chemically reduced in hydrogen to $WO_2$. Finally, the $WO_2$ was heated together with the $V_2O_3$ and $V_2O_5$ at 1100° C. in order to produce the $VO_2$—$WO_2$ mixed powders. However, particle size and product quality were too inconsistent for commercial applications.

In 1971, Rao, Natarajan, Subba Rao, and Loehman disclosed solid solutions of doped $VO_2$ in "*Phase Transitions and Conductivity Anomalies In Solid Solutions of $VO_2$ and $TiO_2$, $NbO_2$ and $MoO_2$ Journal of Physical Chemistry Solids*, 32, 1147-1150 (1971). However, the process required melting stoichiometric proportions of precursor solid oxides in an arc furnace. Polycrystalline pellets are produced but were not commercially useful.

Neither of these efforts produced homogeneous high purity unagglomerated micron sized powders. But, rather, only large pellets and/or highly agglomerated powders with inconsistent physical properties could be obtained. These techniques require such high temperatures that difficulty arises in achieving uniform product and consistent yields.

More recently, evaporative decomposition (hereinafter referred to as "spray pyrolysis") has offered a more promising technique for producing high quality mixed oxide powders. Fine powders of metal oxides have been produced by spray pyrolysis of metal salts such as nitrates, acetates, methoxides and formates. See, for example, T. J. Gardner and G. L. Messing, "*Preparation of MgO Powder by Evaporative Decomposition of Solutions*", Ceramic Bull. 63 [12] 1498-1504 (1984); M. Ramamurthi and K. H. Leong, "*Generation of Monodisperse Metallic, Metal Oxide and Carbon Aerosols*", J. Aerosol Sci. 18 [2] 175-191 (1987); A. Clearfield, A. M. Gadalla, W. H. Marlow and T. W. Liningston, "*Synthesis of Ultrafine Grain Ferrites*", J. Am. Ceram. Soc. 72 [10] 1789-92 (1989); W. R. Moser and J. D. Lennihoff, "*A New High Temperature Aerosol Decomposition Process for the Synthesis of Mixed Metal Oxides for Ceramics and Catalysts and their Characterization*", Chem Eng. Comm. 83, 241-259 (1989); and "T. P. O'Holleran, R. R. Neurgaonkar, D. M. Roy and R. Roy, "*EDS for the Preparation of $\alpha$-$Fe_2O_3$*", Ceram. Bull. 57 [4] 459-460 (1978). However, the only vanadium oxide to be produced from spray pyrolysis has been $V_2O_3$.

$V_2O_3$ powder was produced by Sullivan in 1990 as reported in "*$V_2O_3$ powder by Vaporative Decomposition of Solutions and $H_2$ Reduction*", J Am Ceram Soc, 73 (12), 3715-3717 (1990). In this process, $V_2O_5$ was dissolved in nitric acid for spray pyrolysis of a $V_2O_5$ powder which was then reduced in hydrogen to $V_2O_3$ powder. Since $V_2O_3$ lacks the thermochromic properties exhibited by $VO_2$ powders, spray pyrolysis of such nitrate solutions offers little incentive for solving the commercial problem.

Spray pyrolysis of sulfate solutions would appear to be a potential alternative since sulfate solutions have been evaporatively decomposed with limited success, in making magnesium, copper and iron oxide powders. See, for example, T. J. Gardner and G. L. Messing, "*Preparation of MgO Powder by Evaporative Decomposition of Solutions*", Ceramic Bull. 63 [12] 1498-1504 (1984); C. Roth and R. Kobrich, "*Production of Hollow Spheres*", J. Aerosol Sci. 19 [7] 939-942 (1988); and M. Ramamurthi and K. H. Leong, "*Generation of Monodisperse Metallic, Metal Oxide and Carbon Aerosols*", J. Aerosol Sci. 18 [2] 175-191 (1987). Evaporative decompositional studies help to predict what would occur during spray pyrolysis processes.

However, spray pyrolysis of sulfate solutions to produce $VO_2$ powders, until now, has not been attempted. This is perhaps owed to the fact that evaporative decomposition studies, including thermal gravimetric analysis and chemical equilibrium evaluations at realistic $O_2$ partial pressures, would predict that the thermal decomposition product of vanadyl sulfate ($VOSO_4$) in $H_2$ is $V_2O_3$, and in $N_2$ is a mixture of $V_6O_{13}$ and $V_2O_5$. In the noxious atmosphere of sulfur dioxide ($SO_2$) (which produces unacceptable amounts of $H_2SO_4$ and unacceptable amounts of $V_6O_{13}$ in the presence of $H_2O$) $VOSO_4$ has been thermally decomposed into residual amounts of $V_2O_4$. See J. Tudo, "*Sur L'Etude du Sulfate de Vanadyle et de sa Reduction par L'Hydrogene Sulfure: les Sulfures de Vanadium (Vanadyl Sulfate and its Reduction by Hydrogen Sulfide: Vanadium Sulfides)*", Rev. Chim. Minerale 2 [1] 53-117 (1965). However, in the more acceptable atmosphere of $N_2$, $V_2O_5$ is produced, and as previously discussed, $V_2O_5$ would be expected to reduce to $V_2O_3$ even if the atmosphere was modified by the presence of $H_2$; thus, rendering little incentive to try commercial production of $VO_2$ powders by a spray pyrolysis process of sulfates.

Accordingly, a method for producing high quality unagglomerated micron-sized $VO_2$ or doped-$VO_2$ powder, without undesirable decomposition by-products, would be a novel and unexpected advancement in the art, and fulfill a long felt need in the industry. It would be particularly unexpected to produce such powders from spray pyrolysis of a sulfate solution in $H_2$ atmosphere.

Therefore, it is a principle object of the present invention to provide a high quality $VO_2$ powder.

It is another object to provide a method for producing the high quality $VO_2$ powder at lower temperatures and without intermediate decomposition by-products.

It is another object to provide high quality doped-$VO_2$ powders having room temperature transition by a method simple to implement and requiring a minimum of decomposition variables.

Other objects, advantages, and novel features of the invention will become apparent from the following summary and detailed description of the invention.

SUMMARY OF THE INVENTION

The drawbacks of the prior art are substantially overcome and the above-described objects and advantages are essentially achieved in accordance with the invention. The invention comprises producing an aqueous solution of $VOSO_4$ salt by dissolving the hydrate $VOSO_4.3H_2O$ in water, spray pyrolysis of the solution to evaporate the solvent water and the water of hydration, and decomposition of the salt at less than 800° C. The process is particularly effective when the temperature is at least 740° C. in $N_2$ atmosphere (with $O_2$ partial pressure of at least 13 Pa) and as low as 580° C. at 11 Pa when having an effective amount of $H_2$. The $VO_2$ powder may be produced as a homogeneous mixed metal oxide by doping the hydrate with suitable dopant salts prior to spray pyrolysis.

We have discovered that the process is achieved at high purity despite adverse thermogravimetric and adverse chemical equilibrium analyses which previously predicted quite different results. For example, the thermogravimetric analysis in J. Tudo's studies, supra, indicate that $V_2O_3$ is produced by thermal decomposition of $VOSO_4$ in $H_2$. Furthermore, a thermoequilibrium calculation of the decomposition product of $VOSO_4.3H_2O$ solutions at 740° C. and 100 KPa, in an atmosphere that is initially 17% $H_2$ in $N_2$, predicts that $V_2O_3$ would be produced. However, our x-ray diffraction analysis indicates no $V_2O_3$ in the materials produced in up to 17% $H_2$ and at as low as 580° C. or as high as 740° C. This phenomenon is not completely understood. Our results may be said to stem from an extremely brief residence time in the reactor, at peak temperatures, preventing the reactions from reaching equilibrium. Yet, on the otherhand, the product powders are stable, of higher purity, and exhibit more consistent morphology than prior art $VO_2$ powders, whether doped or undoped.

DETAILED DESCRIPTION AND PREFERRED EMBODIMENTS

Figure 1:
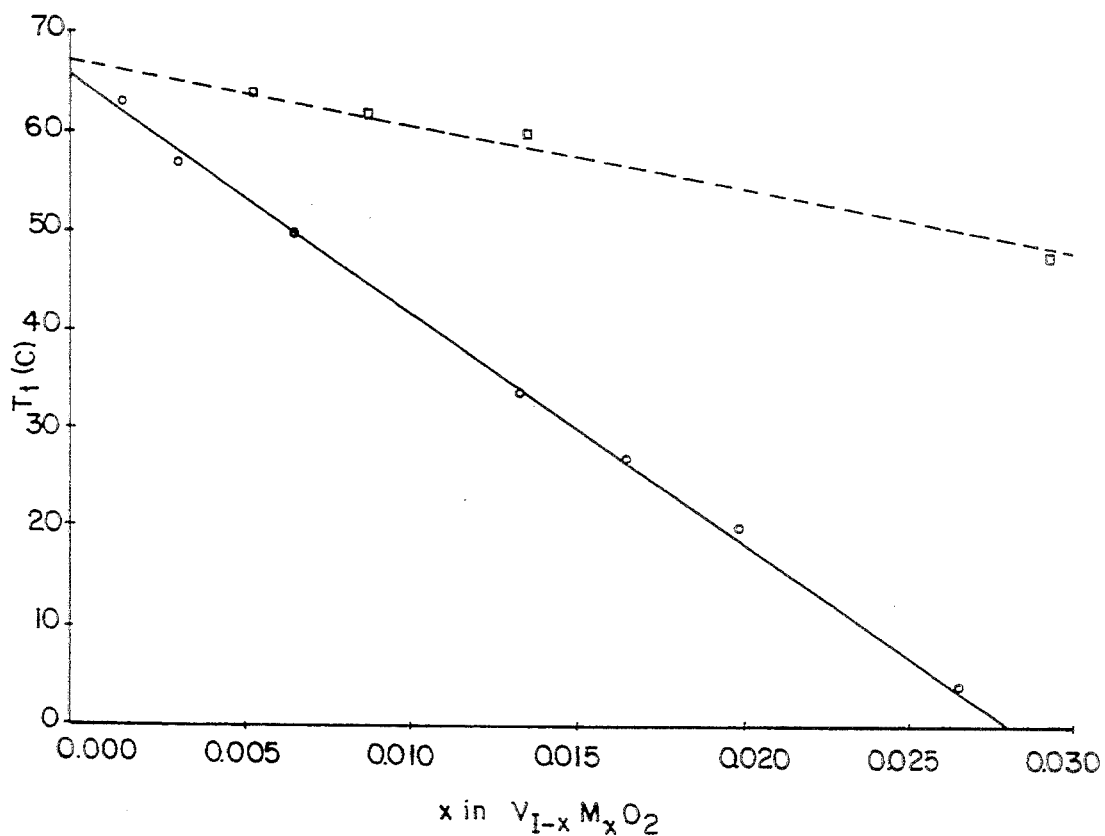
FIG. 1 is a phase transition graph for our molybdenum and tungsten-doped $VO_2$ powder.

In accordance with the present invention, high quality $VO_2$ powder is produced from vanadyl sulfate hydrate, preferably $VOSO_4.3H_2O$. The hydrate is prepared or acquired from readily available sources and then dissolved in aqueous solution. The solution may comprise any convenient concentration of the hydrate which will provide the desired stoichiometric amount of $VO_2$. For example, a preferred range is from about 0.075 to about 0.75 molar. It is particularly preferred to employ the hydrate at a concentration of less than 0.4 molar so as to produce particles with the diameter of 10 microns. Higher molar solutions result in larger particle diameters.

The solution is sprayed, into conventional evaporative decomposition or spray pyrolysis equipment such as a flow reactor, while entrained in a flow of $N_2$. In pure $N_2$ and at a peak pyrolysis temperature of 580° C., although $V_2O_4$ is present, $V_6O_{13}$ is dominant. However, when the peak temperature in $N_2$ is raised to 740° C., the product is almost entirely $V_2O_4$.

In a particularly preferred embodiment of the present invention, the $N_2$ is mixed with an effective amount of $H_2$ for reducing the amount of any discernible intermediate decomposition byproducts, and thus reducing the peak temperature required in decomposing the hydrate to $VO_2$ (or $V_2O_4$). For example, based on x-ray diffraction peaks, increasing the $H_2$ concentration to 17% (by volume) reduces by 90% the amount of by-product $V_6O_{13}$ which otherwise would be present at a peak temperature of 580° C. in pure $N_2$. For 3% $H_2$ in $N_2$ at 740° C. the amount of $V_6O_{13}$ is only 1% of the $V_2O_4$. However, when $H_2$ is greater than 10% at 740° C. there is no discernible $V_6O_{13}$ contribution to the x-ray diffraction pattern. Accordingly, as the amount of $H_2$ increases to about 20%, the peak reaction temperature employed during the spray pyrolysis can be reduced from about 740° C. to about 580° C. while achieving excellent product purity. It is particularly preferred to employ about 17% $H_2$ in $N_2$ and conduct the pyrolysis at a peak temperature of 580° C. for efficient energy and material utilization. The gaseous atmosphere is normally at 101 KPa, thus avoiding the need for operating costly equipment to maintain a vacuum or pressurized environment.

As the droplets of aqueous vanadium salt solution entrained in the gaseous atmosphere are carried into the flow reactor, the feed rate of gas will depend upon the type of equipment, desired production rate and reaction kinetics. The solution droplets must remain at the reactor temperature sufficiently long for the droplets to dry, by evaporation, to dry vanadium salt particles and for the dry particles to subsequently decompose into the vanadium oxide. The time required for these drying and decomposition processes depends upon the reactor temperature, the initial diameters of the solution droplets, and the solution concentration. Higher reactor temperatures reduce the time necessary for droplet evaporation and salt decomposition. Larger spray droplet diameters require longer times for water evaporation and produce larger dry salt particles. Higher solution concentrations also produce larger dry particles for a given initial solution droplet diameter, and larger dry particles require more time for decomposition into the oxide. The Meinhard nebulizer used to demonstrate the process produced spray droplets at a net solution feed rate of 0.18 ml/min, and approximately 10% of the spray volume was contained in drops with diameters less than or equal to 4 $\mu$m, 50% of the spray was contained in diameters less than 16 $\mu$m, and 90% of the spray in diameters less than 32 $\mu$m. For these spray droplet diameters, solution concentrations between 0.075 and 0.75 molar, and reactor temperatures between 580° and 740° C., a reactor residence time of approximately 2 seconds was sufficient in producing the Oxide. To achieve this residence time in the 1-meter long, 27 mm-i.d. demonstration reactor, the spray was entrained in an approximately 5 liter/minute flow of gas. Larger or smaller tube diameters, or longer of shorter reactor lengths, would require proportionately smaller or larger carrier gas flow rates to achieve a similar residence time.

The filtered material may also be heated to assure complete decomposition and to prevent condensation of gaseous byproducts on the oxide particles. A convenient temperature for such purpose can be, for example, about 450° C. The temperature should exceed the boiling point of any undesired condensable gaseous species at the reactor pressure. For decomposition of vanadyl sulfate solutions the readily condensable species are water vapor and small amounts of sulfuric acid produced as deposition byproduct. To prevent condensation of these gases at one atmosphere reactor pressure, the filtered powder must be held at least at 336° C. The upper temperature for retaining the powder is the vanadium-oxide melting temperature of 1540° C., although in a practical system the temperature is limited by the filter material or other construction materials, or the cost of electrical power required to maintain high temperatures.

The product $VO_2$ (also known as $V_2O_4$) comprises spherical particles less than 1 micron in size but are aggregated into aggregate diameters having diameters from about 0.5 microns to about 10 microns. Those aggregates which are more than a few microns in diameter are hollow shells.

The general technique of thermally decomposing aqueous solutions of vanadyl sulfate hydrate to produce $VO_2$ can be used to produce $VO_2$ doped with a variety of other metals to produce varying transition temperatures. A particular advantage of producing doped $VO_2$ powders by the present invention is that the stoichiometry can be controlled more accurately and therefore the particles are more discrete and homogeneous without the anticipated by-product impurities. Thus, doped powders having a more accurately controlled doping level are also achieved.

In a preferred embodiment of this invention, metal doped-$VO_2$ powders can be produced having the formula $V_{1-x}M_xO_2$, where M is the dopant metal, and x is less than 1.

The preferred dopant metals are those which reduce the $VO_2$ transition temperature to near room temperature. Metals, therefore, found to be particularly preferred are, for example, molybdenum (Mo) and tungsten (W). To reduce $V_{1-x}M_xO_2$ phase transition temperature to 20° C. with M doping (M=tungsten), the preferred x equals 0.03.

Salts of the dopant metals, for example oxygen chloride salts, such as $WO_2Cl_2$ and $MoO_2Cl_2$ are dissolved in the $VOSO_4.3H_2O$ solution at stoichiometric amounts. Although the level of doping does effect the final particle size, superior powders are nevertheless produced at micron-size diameters. The relative proportions of $VOSO_4.3H_2O$ and dopant are determined by the desired product composition. The dopant metal is added in the form of any water soluble salt which will not interfere with the reaction, but preferably the oxygen chloride salts because these salts are highly soluble in water and are inexpensive.

At peak temperatures, in the earlier described range, the dopant salts simultaneously decomposed with the $VOSO_4.3H_2O$ to produce the doped-$VO_2$ powders. Initially, the particles are formed as solid exterior but hollow interior sulfate shells enveloping a liquid core of the remaining solution. A hole forms in the shell from the pressure of evaporating solution rupturing through to the outside of the sulfate shell. A porous surface is thus produced during decomposition of the sulfate shell together with very small fragments from the shell and pyrolysis products of ejected liquid.

The following example is illustrative of the invention.

EXAMPLE 1

Several samples of molybdenum and tungsten doped $VO_2$ powders were prepared having the formula

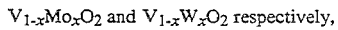

$V_{1-x}Mo_xO_2$ and $V_{1-x}W_xO_2$ respectively, where x was less than 1.0.

For all samples, 0.4 molar solutions of $VOSO_4.3H_2O$ and either $WO_2Cl_2$ or $MoO_2Cl_2$ dopant salts dissolved in distilled water were prepared. The molar amounts of the hydrate to the dopant salt were the stoichiometric amounts designated by 1-x and x, respectively.

Sprays of the solutions were produced from a pneumatic nebulizer in a conventional spray pyrolysis configuration. The sprays were each entrained in a 1 l/min. flow of $N_2$ into a flow reactor where the sprays mixed with a coaxial, 5 l/min. flow of 17% $H_2$ in $N_2$. The reactor consisted of a 1 meter long, 27 mm i.d. quartz tube heated by three tube furnaces that allowed the temperature to be varied independently in each section of the reactor. The reactor temperature was 730° C. and the reactor was run at atmospheric pressure. The residence time in the reactor was about two seconds for each sample. The pyrolyzed powder was collected on a glass fiber filter that was heated to 450° C. The morphology and chemical composition of the final pyrolyzed powder is determined by x-ray diffraction, energy-dispersive x-ray spectroscopy and scanning electron microscopy. The phase transition temperatures and heats of transformation were determined by differential scanning calorimetry at a rate of 5° c/min.

The dopant levels were confirmed by weight-to-weight analysis of the hydrate and dopant salts, rather than by energy dispersive x-ray analysis because of using very small percentages of dopant.

Where x=0, the phase transition temperature was 66° C. Where M was W and x was up to 0.026, the threshold transition temperature decreases linearly with increasing x. The relationship was also linear from M=Mo and x was up to 0.03. FIG. 1 illustrates this relationship.

Figure 2:
FIG. 2 is a micrograph of our tungsten-doped $VO_2$ powder where $x=0.02$.
Figure 3:
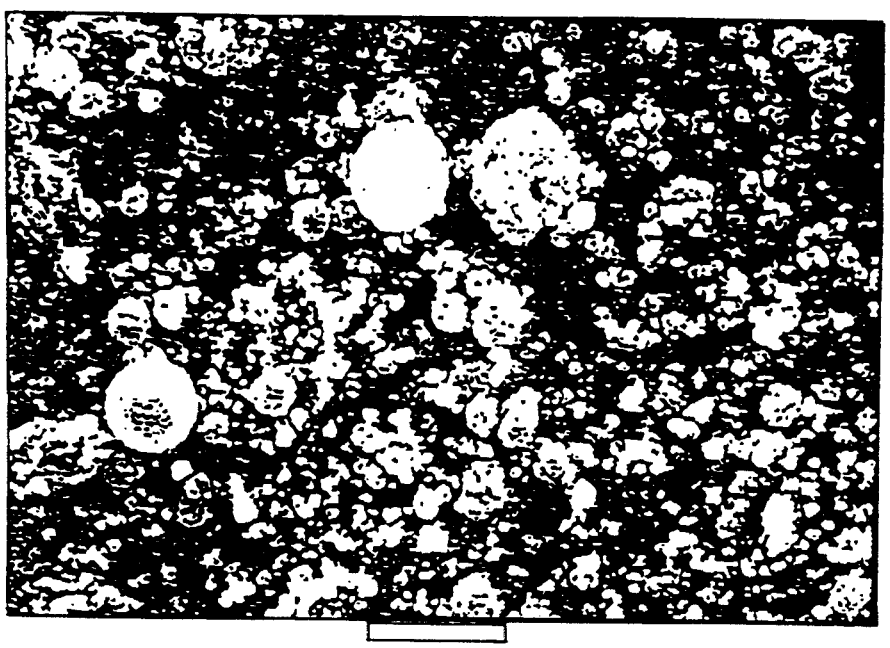
FIG. 3 is a micrograph of our molybdenum-doped $VO_2$ powder where $x=0.015$.

The final powders were primarily hollow, roughly spherical particles with porous shells. Smaller fragments of the shell are also present as a consequence of the pyrolysis of liquid ejected from the primary droplets when the internal pressure from evaporating solution causes rupture of a sulfate shell that forms initially around the droplets. FIG. 2 where M=W and x=0.020 and FIG. 3 where M=Mo and x=0.015 illustrates the particles.

Figure 4:
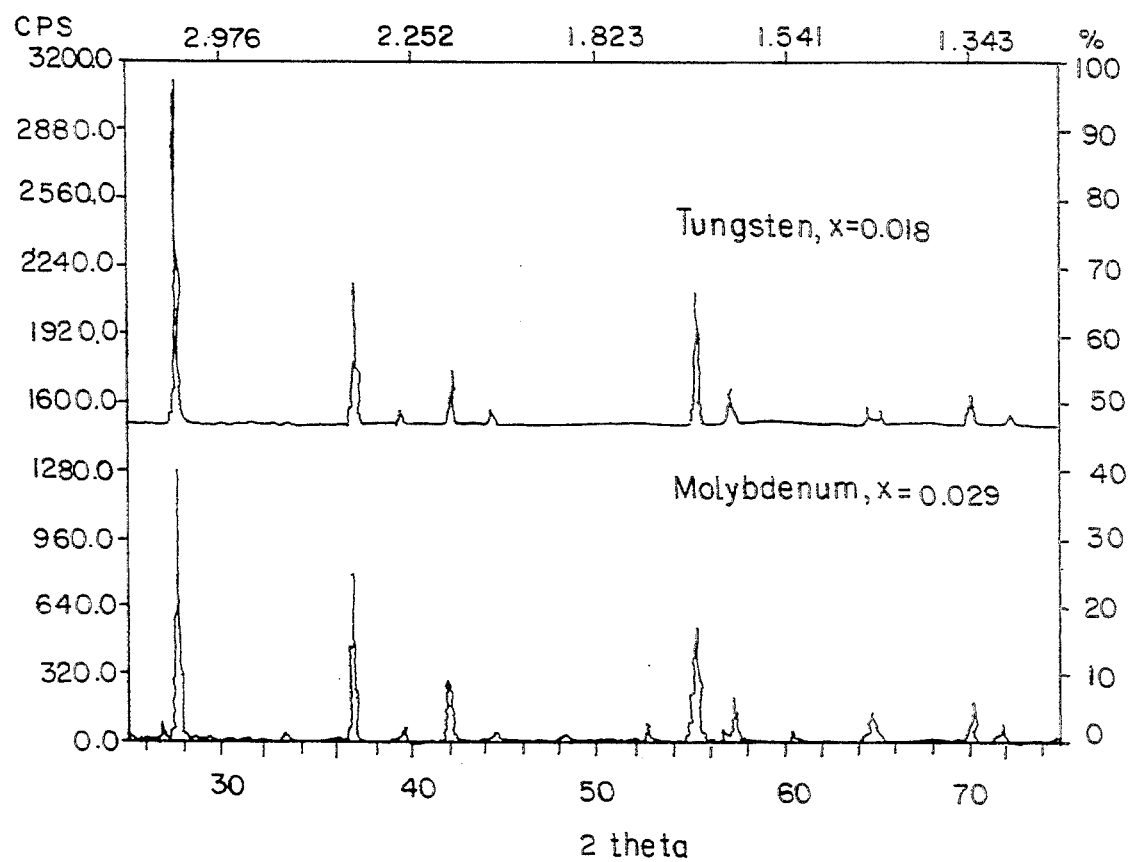
FIG. 4 is a graph showing X-ray diffraction patterns for our tungsten-doped $VO_2$ where, $V_{1-x}W_xO_2$, $x=0.018$ and for our molybdenum-doped $VO_2$, $V_{1-x}Mo_xO_2$, where $x=0.029$.

X-ray diffraction patterns of molybdenum-doped powder with x=0.029 and tungsten-doped powder with x=0.18 are shown in FIG. 4. The d-spacings of the undoped material correspond to those computed from cell parameters reported for $VO_2$. The pattern of the molybdenum-doped material indicates the anticipated monoclinic $VO_2$ structure. The room temperature (25° C.) structure of tungsten-doped vanadium dioxide changes from monoclinic to tetragonal when x exceeds 0.016. The x-ray diffraction pattern of the spray-pyrolysis produced tungsten-doped material indicates the monoclinic structures for x=0.013 and a tetragonal structure for x=0.018, as indicated in FIG. 4. The observed d-spacings agree with those calculated from the tetragonal cell parameters reported for tungsten-doped vanadium dioxide.

Energy-dispersive x-ray analysis of the powders indicated that the residual sulfur concentration was less than 0.2 atomic percent in the undoped and tungsten-doped materials. The sulphur content of the molybdenum-doped material could not be determined reliably because the sulfur and molybdenum energy-dispersive x-ray peaks could not be sufficiently resolved; however, the concentration is assessed as not larger than that in the tungsten material. Differential scanning calorimetric analysis of the powders indicated no reactions or transitions between −40° and 600° C. other than the monoclinic-tetragonal transition. The x-ray diffraction patterns do not indicate the presence of $V_2O_3$, $V_2O_5$, $VOSO_4$, $V_6O_{13}$ or any other intermediate decomposition species.

EXAMPLE 2

A similar sample to those in Example 1 were produced except that there was no dopant and no $H_2$ in the $N_2$. Also, the peak reactor temperature was 740° C. The $N_2$ flow was 5 l/min.

The material was analyzed by x-ray diffraction to be almost entirely $V_2O_4$. A small amount of $V_6O_{13}$ was present. The $O_2$ partial pressure in the reactor was computed at 13 Pa, which $O_2$ pressure was previously reported to produce $V_2O_5$, not $V_2O_4$.

Another sample was run with pure $N_2$ at 580° C. and a computed oxygen partial pressure or 11 Pa, which showed predominantly $V_6O_{13}$, as would have been predicted.

EXAMPLE 3

A similar sample to Example 1 was produced where there was no dopant but the 17% $H_2$ in $N_2$ was present. At 580° C. there was 40% less $V_6O_{13}$ and the product was predominantly $V_2O_4$. No $V_2O_5$ or $V_2O_3$ was present even though thermodynamic analysis would predict it.

What is claimed is:

1. A method for making high purity unagglomerated metal-doped vanadium dioxide powder having a micron particle-size, said powder having a formula $V_{1-x}M_xO_2$, where M is a dopant metal selected from the group consisting of tungsten and molybdenum and x is less than 0.03;

the method comprising forming an aqueous solution of vanadyl sulfate hydrate at a concentration of 0.075 to 0.75 molar admixed with an amount of a salt of the dopant metal sufficient to provide x in the formula, entraining the aqueous solution in a gas flow of pure $N_2$ and spray pyrolyzing at a reaction temperature of at least about 740° C. for a sufficient amount of time to form the metal-doped vanadium dioxide powder.

2. The method of claim 1 wherein an amount of $H_2$ of about 17% by volume is mixed with the $N_2$ to permit the reaction temperature to be lowered to about 580° C.

3. The method of claim 1 wherein the salt of the dopant metal is an oxygen chloride salt.

4. A method for making high purity unagglomerated vanadium dioxide powder having a micron particle size;

the method comprising forming an aqueous solution of vanadyl sulfate hydrate at a concentration of 0.075 to 0.75 molar, entraining the aqueous solution in a gas flow of pure $N_2$ and spray pyrolyzing at a reaction temperature of at least 740° C. for a sufficient amount of time to form the vanadium dioxide powder.

5. The method of claim 4 wherein an amount of $H_2$ of about 17% by volume is mixed with the $N_2$ to permit the reaction temperature to be lowered to about 580° C.

* * * * *